United States Patent
Decobert et al.

(10) Patent No.: US 10,684,197 B2
(45) Date of Patent: Jun. 16, 2020

(54) ROLLING UNIT FOR A DYNAMIC RIG FOR TESTING A TRAIN, ESPECIALLY AN AUTOMATIC UNDERGROUND TRAIN, AND RIG COMPRISING SUCH A UNIT

(71) Applicants: SPHEREA TEST & SERVICES, Colomiers (FR); SEREME, Bondoufle (FR)

(72) Inventors: Francois Decobert, Moret sur Loing (FR); Yannick Le Guennec, Pithiviers (FR); Thomas Diego Raymond Gautier, La Salvetat St Gilles (FR)

(73) Assignees: SPHEREA TEST & SERVICES, Colomiers (FR); SEREME, Bondoufle (FR)

( * ) Notice: Subject to any disclaimer, the term of this patent is extended or adjusted under 35 U.S.C. 154(b) by 164 days.

(21) Appl. No.: 15/521,020

(22) PCT Filed: Oct. 23, 2015

(86) PCT No.: PCT/FR2015/052863
§ 371 (c)(1),
(2) Date: Apr. 21, 2017

(87) PCT Pub. No.: WO2016/062980
PCT Pub. Date: Apr. 28, 2016

(65) Prior Publication Data
US 2017/0336291 A1  Nov. 23, 2017

(30) Foreign Application Priority Data
Oct. 23, 2014 (FR) ...................................... 14 60213

(51) Int. Cl.
G01M 17/08 (2006.01)
G01M 17/10 (2006.01)
(Continued)

(52) U.S. Cl.
CPC ............. *G01M 17/10* (2013.01); *B60T 17/20* (2013.01); *B60T 17/228* (2013.01); *B61L 27/0055* (2013.01); *G01M 17/08* (2013.01)

(58) Field of Classification Search
CPC ............................... G01M 17/08; G01M 17/10
(Continued)

(56) References Cited

U.S. PATENT DOCUMENTS 1,894,935 A * 1/1933 Bigelow ................... G01L 5/28
73/126
1,950,607 A * 3/1934 Bigelow ................... G01L 5/28
73/125
(Continued)

FOREIGN PATENT DOCUMENTS

DE 195 05 533 A1 8/1996
EP 0 441 298 A1 8/1991
(Continued)

OTHER PUBLICATIONS

International Search Report, dated Feb. 8, 2016, from corresponding PCT application.

*Primary Examiner* — Robert R Raevis
(74) *Attorney, Agent, or Firm* — Young & Thompson

(57) ABSTRACT

Disclosed is a rolling unit (8) for a test rig (1) for testing an automatic underground train, including: two rolling belts (27), each one provided for a wheel (6) of the train to roll thereon, the wheels driving the movement of the belts; and a rotary inertial body (28); each belt including: a pinion (31) that is rotatably connected to the inertial body; two rollers (33); and a grooved rolling surface (32) mounted on the rollers, meshed with the pinion, and forming a rolling area (34) for a respective wheel between the rollers.

15 Claims, 6 Drawing Sheets

(51) Int. Cl.
  *B61L 27/00* (2006.01)
  *B60T 17/20* (2006.01)
  *B60T 17/22* (2006.01)
(58) Field of Classification Search
  USPC ..... 73/11.06, 457, 118.01, 118.02, 121, 123,
  73/125, 862.08–862.339, 862.37,
  73/862.192–862.195, 865.6
  See application file for complete search history.

(56) References Cited

U.S. PATENT DOCUMENTS

| | | | | |
|---|---|---|---|---|
| 2,696,104 A | * | 12/1954 | Markey | B64F 5/60 |
| | | | | 184/6 |
| 4,455,866 A | | 6/1984 | Barrigar | |
| 4,944,714 A | | 7/1990 | Storck | |
| 5,241,854 A | | 9/1993 | Kaizu et al. | |
| 6,257,054 B1 | * | 7/2001 | Rostkowski | G01L 3/22 |
| | | | | 73/116.08 |

FOREIGN PATENT DOCUMENTS

| | | | |
|---|---|---|---|
| ES | 2 398 798 A1 | | 3/2013 |
| GB | 265440 | * | 5/1926 |

* cited by examiner

ROLLING UNIT FOR A DYNAMIC RIG FOR TESTING A TRAIN, ESPECIALLY AN AUTOMATIC UNDERGROUND TRAIN, AND RIG COMPRISING SUCH A UNIT

This invention relates to a test rig for an underground, especially an automatic underground. In particular, the invention relates to a test rig for equipment in service, which is provided to receive passengers, once the verifications have been done.

Currently, tests of underground trains or more generally of trains, are carried out on test tracks. Such a test track can occupy several thousands of square metres; such a surface is not always available for setting up a test track and if it is available, it can advantageously be allocated to other uses.

The invention has for purpose to propose a rig that meets the needs to which a test track generally responds to, without the constraint of its encumbrance. As such, such a rig has to simulate the test track in a limited space. It must in particular simulate:

The displacement: The train must be placed in operational condition for displacement, the motors of the train will drive the wheels.

The inertia of the train: When the train accelerates or decelerates, it displaces its own weight which generates a torque on the wheels.

The communication with the train: so that the train can be displaced, it receives and transmits information through the intermediary of antennas located in the 'belt' of the track.

The operator interface.

The rig must make it possible to reproduce all of the tests that are usually conducted on the test track:

Tests on the traction, braking, controlling functions of the train,

Controls on compliance with speed instructions,

Tests on placing into movement of the train, stopping in a station and communicating with the equipment of the station, Safety controls of the vehicle (safety frequency, anti-collision, detection of obstacles, EVAC function, etc.)

Controls on the operation of the electrical braking,

Reproduction of circulation,

Tests on the maintenance and service functions of the train (plate running-in, voice and interphone links, states of the equipment).

In order to achieve its purpose, a first objet of the invention is a rolling unit that can be used in a rig in order to test a train, especially an automatic underground train, characterised in that it comprises:

two rolling belts arranged in such a way that on each belt a wheel can roll carried by a respective end of the same axle of the train, with a rolling of the wheels driving a movement of the belts; and, a rotary inertial body designed in such a way that the movement of the belts drives a rotation of the body.

In a preferred embodiment, each belt comprises:

a drive wheel, linked in rotation with the inertial body;

two rollers; and, a rolling surface mounted on the rollers and engaged with the drive wheel, with the surface forming between the rollers a substantially horizontal rolling area for a respective wheel of the train.

Such a rolling unit advantageously comprises a motor, preferably a gear reducer, connected to the pinion, with the motor being in particular suited for modulating the inertia of the inertial body, and/or, simulating a slope, and/or, offsetting the friction internal to the rig. The modulation of the inertia of the inertial body, makes it possible to simulate a train with variable weight, for example more or less loaded.

Preferably, the rolling surface is grooved and the drive wheel is a pinion meshed with this grooved surface.

The invention also proposes a test rig comprising at least one rolling unit according to the invention.

According to a second object, the invention proposes a rig for testing a train, especially an automatic underground train, characterised in that it comprises at least two rolling units that are separate from one another, with each one provided to have at least one wheel of the train rolling therein, with each unit comprising:

a rotary inertial body;

a motor connected to this inertial body; and, a sensor for the rotation speed of the inertial body;

with the rig further comprising means for controlling each motor in such a way as to constantly cancel the difference in speed between the rolling units.

Advantageously, the means of controlling comprise means for ensuring that the corrections ordered of the two motors are globally of zero energy.

The means for controlling can also be adapted to provide a torque setting for:

simulating a train that has an inertia that is slightly different; and/or, simulating a slope: and/or, offsetting the friction internal to the rig.

According to a third object, the invention proposes a device for simulating a communication between the train, especially an automatic underground train, immobile on a test rig, and a track whereon it is made for circulating, characterised in that it comprises:

at least one rolling unit for a wheel of the train;

a speed sensor, mounted on the rolling unit of the rig;

at least one rig antenna arranged on the rig, facing a corresponding antenna of the train;

means (10) for deducing, from this speed, a relative position and a distance travelled simulated of the train in relation to the transmitting antennas; and, means so that the rig antenna emits a required signal intended for the antenna of the train, when a specific distance has been travelled.

Such a device according to the invention, in order to simulate an SF communication (acronym for Safety Frequency) between the train, especially an automatic underground train, immobile on a test rig, and a track whereon it is made to circulate, is characterised in that:

the at least one rig antenna comprises two antennas, with each one being an emitting antenna for an SF signal and arranged in the rig in a location provided for a respective antenna of the train, with this antenna of the train being provided to receive the SF signal;

the means so that the rig antenna emits a required signal intended for the antenna of the train comprises means for authorising a phase transition when a specific distance has been travelled.

Such a device according to the invention, in order to simulate a detection by the train, especially an automatic underground train, immobile on a test rig, of studs present in a track whereon it is made for circulating, is characterised in that:

the at least one rig antenna comprises at least one metal stud that can be insulated or connected electrically;

the means so that the rig antenna emits a required signal intended for the antenna of the train comprises means, preferably relays, to connect or electrically insulate the stud during a time corresponding to a specific distance travelled.

Other characteristics and advantages of the invention shall appear when reading the detailed description of several embodiments of the invention given as non-limiting examples, in reference to the annexed drawings wherein.

Figure 1:
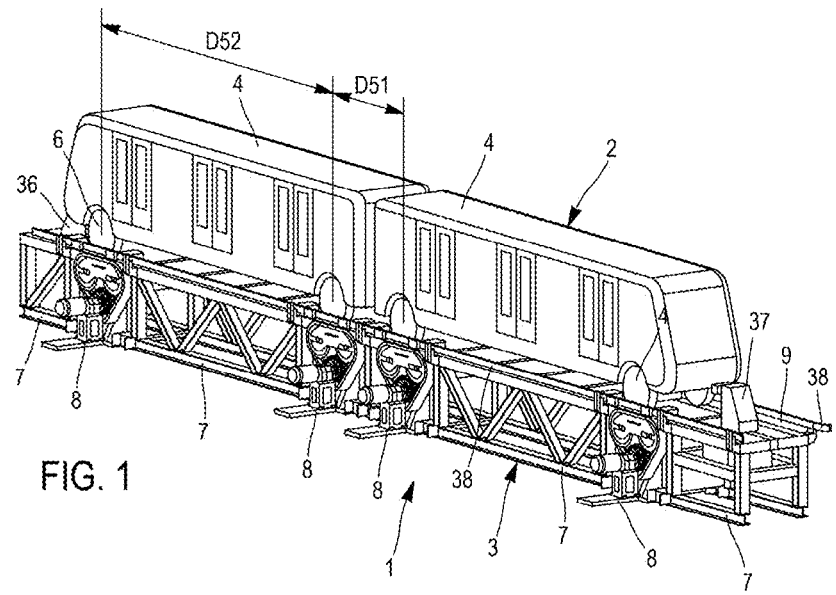
FIG. 1 is a perspective rear three-quarter view, primarily of the mechanical portion of a rig according to the invention and of a train on this rig.
Figure 4:
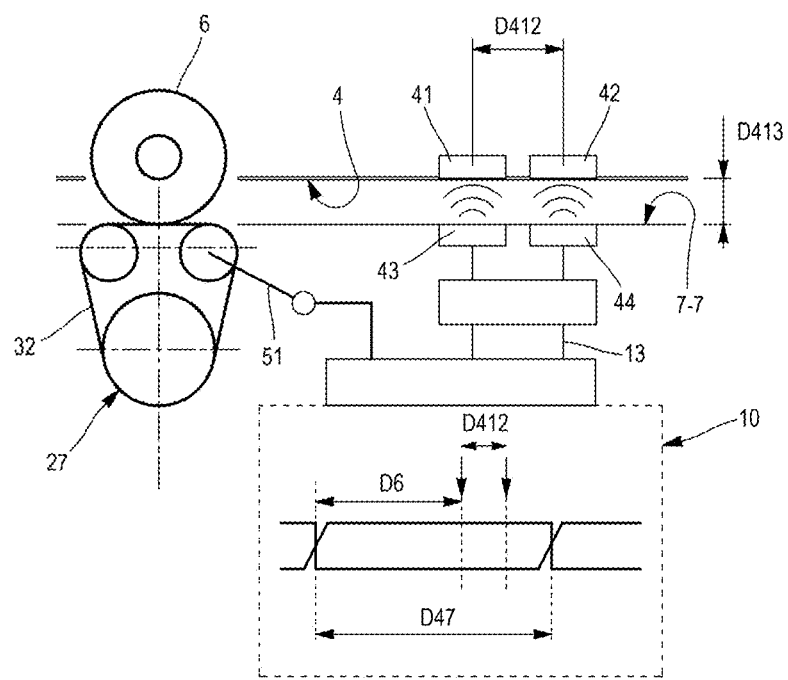
Figure 5:
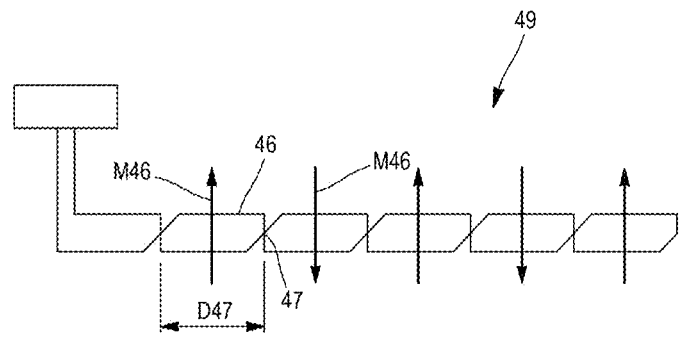
Figure 6:
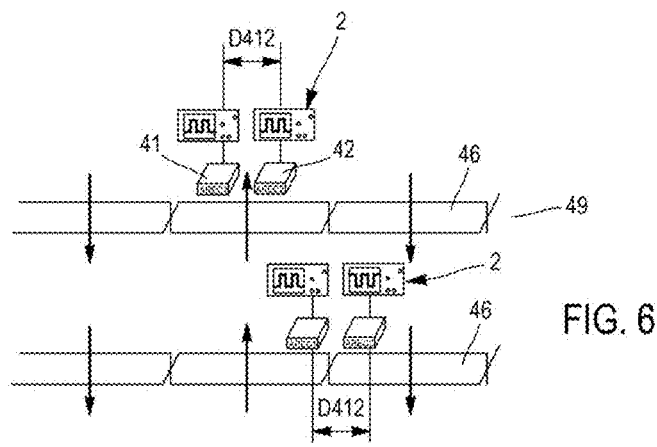
Figure 7:
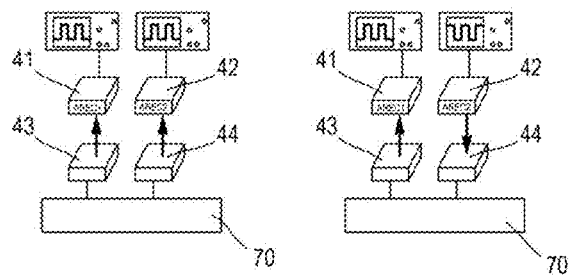

FIG. 4 diagrammatically shows means of communication of the train with its system infrastructure;

FIG. 5 diagrammatically shows an SF antenna such as exists on an operating track;

FIG. 6 diagrammatically shows the operation of the antenna of FIG. 5;

FIG. 7 diagrammatically shows a simulation of the operation of the antenna of FIG. 5, such as implemented on the rig of FIG. 1

Figure 9:
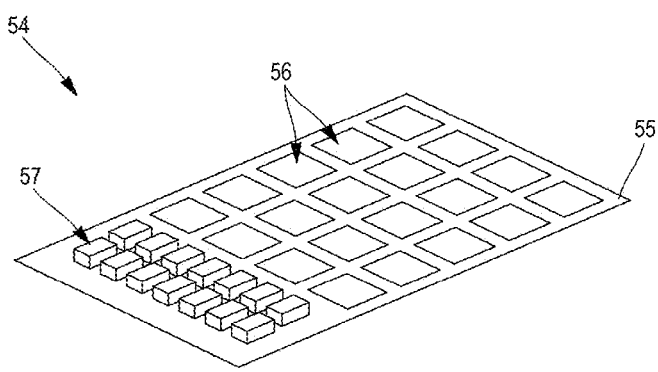
Figure 8:
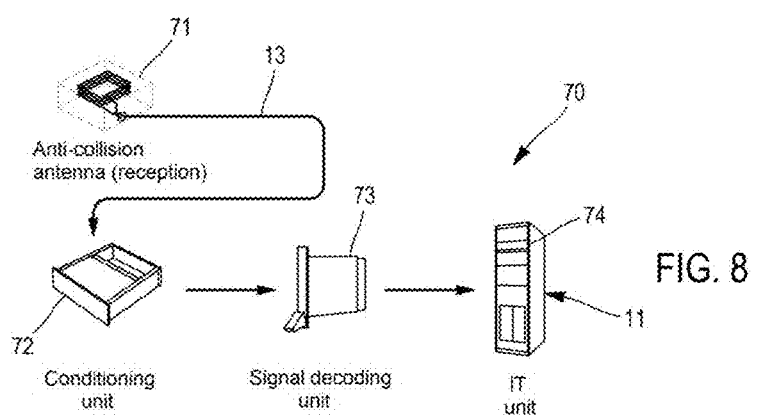
Figure 10:
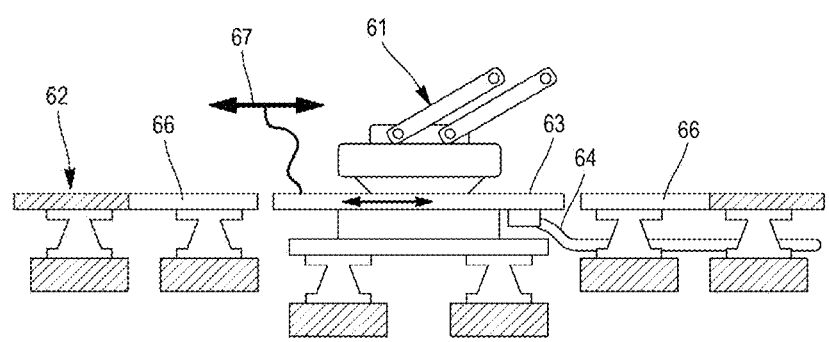

FIG. 8 shows the composition of an antenna for the rig of FIG. 1 according to the principle of the FIG. 8;

FIG. 9 shows a stud simulator; and,

FIG. 10 shows the simulation of a supplying of the train by shoe.

FIG. 1 shows a test rig 1, provided for testing an automatic underground train 2. Only a portion of the rig 1, forming a mechanical set 3 also called an inertial rig, is shown in FIG. 1. The train 2 comprises two cars 4 each comprising two axles 5, with each axle being in the vicinity of a respective end of the car, and, with each axle carrying two wheels 6. In the example shown, the wheels are provided with tyres.

The mechanical set 3 is in charge of the mechanical resistance of the train under test, as well as the transmission and the recovery of the forces transmitted by the train 2 (traction/braking). A rolling unit 8 is placed under each axle 5 of the train 2. Frames 7, formed of a truss of metal joists, are arranged on either side of the rolling units 8. The frames 7 each form a bearing structure 7-7 for a rolling track 9. This track 9 allows for the circulation of the train 2 when it is placed on the rig 1. The mechanical portion is preferably arranged in a trench, not shown in the figures, is such a way that the rolling track 9 of the rig is level with an access track to the rig.

Figure 2:
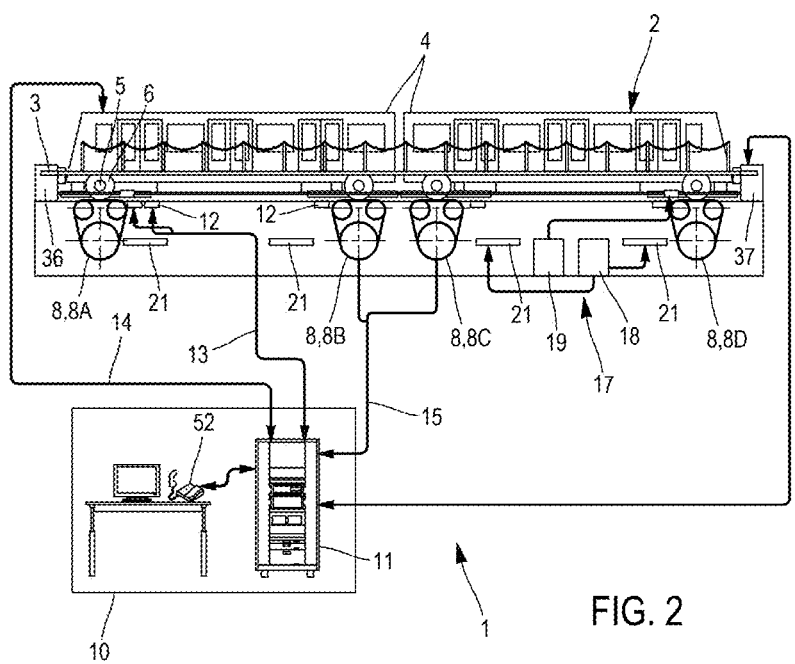
FIG. 2 is a diagrammatical representation, showing the rig of FIG. 1, comprising its system infrastructure.

As shown in FIG. 2, the rig 1 further comprises a control unit 10, which allows the rig 1 to be controlled by an operator. This unit 10 is comprised of an IT bay 11 comprising the input/output cards, as well as the means for control, especially a real-time calculation unit and a unit dedicated to the Man-Machine interface. A graphics interface of the control unit allows the operator access to all of the parameters of the rig 1.

The rig 1 further comprises means for communicating with the train 2, especially:
antennas 12 that are compatible with those used by the train, and connected by "antenna links" 13 to the control unit 10;
hitching connectors ("train line" connection),
a "voice" connection 14,
various sensors 15 (collision sensor, axle speed, etc.)
The rig 1 also comprises electrical means 17, especially:
a low voltage distribution 18,
a Power Traction distribution 19, comprising a "shoe link" to the train 2,
a signalling of the rig 1,
a lighting 21 of the rig 1.

Figure 3:
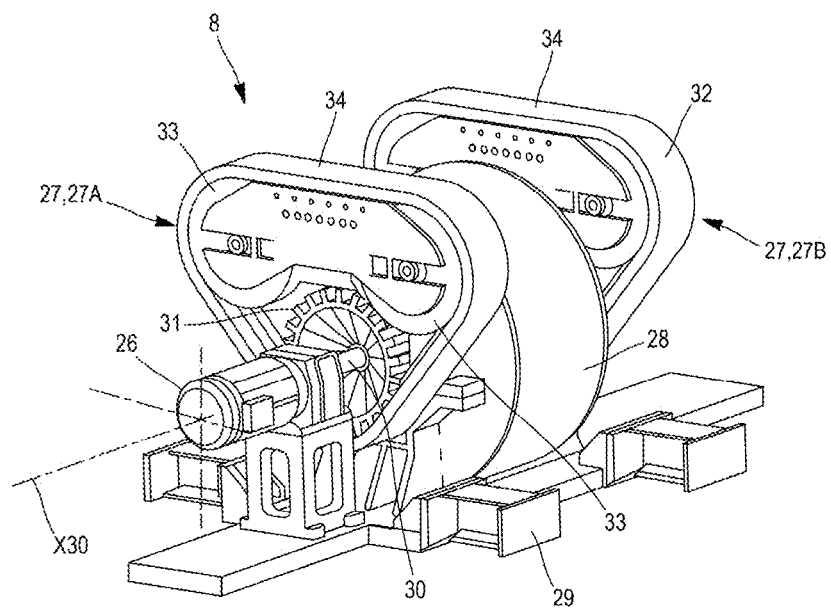
FIG. 3 is a perspective rear three-quarter view of a rolling unit for the rig of FIG. 1.

A rolling unit shall now be described, in reference to FIG. 3. The rig 1 comprises four rolling units 8, arranged in such a way that a respective axle 5 rests on each unit 8. The rolling units are substantially identical between them.

Each unit comprises in particular:
a motor, a gear reducer, electric 26;
two belts 27, substantially identical between them;
a cylindrical inertial body 28; and,
a frame 29, that carries these elements 26-28.

The motor 26 is engaged with a horizontal shaft 30, of axis X30 transversal to the rolling track 9. On this shaft are arranged:
at a first end of the shaft, the motor 26;
then, in the direction of the second end of the shaft 30:
a first drive wheel 31, for a first of the belts 27A;
the inertial body 28; and,
a first drive wheel, for the second belt 27B.

Each belt comprises a rolling surface 32. This belt 32 is stretched over two respective rollers 33 and is engaged on one of the drive wheels 31. The rollers are substantially identical between them, rotating freely on their respective axes, these axes are horizontal and coplanar. The drive wheel is arranged lower than the rollers; it transmits the movements of the belt 32 to the shaft 30 and to the inertial body 28.

In the example shown, the drive wheels are the pinions 31 and the rolling surface 32 is a grooved surface meshed with a respective pinion 31.

A rolling area 34 is formed by the surface 32 in its upper portion located between the rollers 33. This rolling area 34 is substantially flat and horizontal, it is arranged in the extension of the track 9 carried by the frame 7. Furthermore, this zone 34 is arranged to be displaced according to a longitudinal direction, defined by the longitudinal direction of the track 9.

The rolling area 34 is provided so that a respective wheel 6 of the train 2 rests therein. The surface 32 is driven in movement by the rolling of the wheel 6 on the rolling area 34. Means for maintaining, not shown, arranged under this zone, make it possible to limit the deformation of the rolling area under the weight of the train, partially transmitted by the wheel 6. Thanks to the flatness of the zone 34, the deformation of the tyre is substantially identical to what it is on an operating track. The length of the rolling area is chosen to be sufficiently long to allow for a longitudinal displacement of the axles during testing. There is substantially no vertical displacement; the differences in level between the rolling area 34 and the track 9, which could give rise to a problem during the installation of the train, can be offset easily.

In the example shown, for each belt 27:
the load capacity is about 40 kN, or 106% of the nominal load for a 30 T train;
the permissible traction/braking force is 7 kN;
the rolling area 34 is 25 centimetres wide and 35 centimetres long.

The inertial body 28 is rotably mounted on the shaft 30, rigidly connected to the pinions 31, is such a way that it rotates about the axis X 30 of this shaft. In the example shown, the winding diameter of the surface 4 on its pinion 31 is about 800 millimetres and the maximum linear speed of the train 2 is 10 metres per second. As such, the maximum rotating speed of the inertial body 38 is about 4 revolutions per second. The inertial body 28 makes it possible to accumulate or restore energy which simulates the inertia of the train at starting or breaking.

The inertial body is arranged between the belts 27, i.e. very close to the latter. As such, the shaft 30 and the inertial bodies 28 constitute an extremely rigid transmission, synchronising the two wheels 6 of the same axle 5. Their strong bending inertia renders the effects of the shaft bending insignificant. These elements constitute the device for synchronising axles.

In the example shown, the inertial bodies substantially have the following characteristics:
  Mass: about 2,500 kg
  Inertia: about 1,000 kg m2
  Outer diameter: about 1,700 mm
  Diameter of the bearings: about 200 mm
  Peripheral speed for an underground speed of 10 m/s: 21 m/s The inertial body is carried out using a machined steel tub (inside and outside) whereon flanges, which are also machined, are added by screwing. It is mounted on the frame of the rolling unit by the intermediary of roller bearings.

The rear axle 5 of the car 4 at the front of the train 2, and the front axle 5 of the car 4 at the rear of the train are close to one another. In this example, the distance D51 between these two axles is about 3 metres. A mechanical link between the corresponding rolling units 8 is used.

The two axles 5 of the same car 4 are separated by about 10 metres. In order to eliminate the risks linked to the use of a mechanical link over such a distance, an electric shaft is used to synchronise the corresponding rolling units 8 between them, with the electric shaft forming a virtual link between the bodies. Such an electric shaft comprises encoders provided on each rolling unit. A control in a closed loop is carried out, thanks to the speed sensors 15, by the means of controlling the control unit 9, in such a way as to constantly cancel the difference in speed between the rolling units. It is moreover ensured that the corrections given to the two motors are globally of zero energy. In this way, a stiff and energy-wise neutral mechanical shaft is reproduced, which does not slow down or accelerate the system.

Each electric shaft uses two geared motors 26, with each one mounted on a respective rolling unit 8, at each end of this electric shaft. The motors 26 and variators used are of limited power, with respect to the imbalances to be corrected, not with the total power on the axles. The electrical consumption is low, compatible with the low-voltage distribution network 18, since an energy recovery mechanism 28 is used. In the example shown, each motor 26 has a power of 75 kW.

The controlling of the electric shaft is carried out in such a way that it reproduces a "passive" transmission member, i.e., globally, it does not add or remove any energy from the inertial rig.

The electric shaft offers extended possibilities for use of the rig, via the introduction of a torque setting for:
  simulating a train that has an inertia that is slightly different;
  simulating a slope: and/or,
  offsetting the friction internal to the rig.

Stoppers 36, 37 are fixed on the bearing structure 7-7. The stoppers are provided for blocking the train longitudinally. The front stopper 36 is fastened relatively to the bearing structure. The rear stopper 37 is retractable, in such a way that it can be retracted in order to allow for the movements of the train 2, when it is placed on or removed from the rig 1. The manoeuvres of the rear stopper 37 are preferably motorised and controlled manually, for example by using a button box. Position sensors are provided on the rear stopper 37, in such a way that the launching of a test is possible only if this stopper is in place.

The fastening of the stoppers 36, 37 on the bearing structure allows for a mechanical looping of the traction forces and as such prevents mechanically stressing the slab of the trench and the slab of the building, around the trench. The guiding of the train for setting it on or for removing it from the rig, as well as the lateral maintaining thereof during tests is provided by the lateral guide rails 38.

The rig 1 further comprises four simulators of the presence of a foreign body. These simulators are arranged on the bearing structure 7-7, in such a way that each one is facing a detection bar of the tested train. When a simulator is activated, an electric cylinder applies a force of 65 N on the detection bars of the trains. When it is not activated, it is retracted under the bearing surface. The force exerted is measured using a load cell. A position or electrical end-of-travel sensor provides information on its position.

FIG. 4 diagrammatically shows means of communication 41-44 of the train 2 with its system infrastructure 10-13. The top portion of FIG. 4 shows the position of these means of communication relatively to the train. The bottom portion of FIG. 4 is a detailed view of these means of communication.

During operation, the train communicates via emitting/receiving antennas 41, 42 that are its own, located at the bottom portion of the train 4, and communicating via induced current with current loops arranged in the tracks that are normally used in operations. The rig 1 comprises rig antennas 43, 44 designed to simulate the loops of the operating track. The rig antennas 43, 44 are installed on the bearing structure 7-7, in such a way that each one is facing a respective antenna 41, 44 of the tested train 2. Each antenna 41, 42 of the train 2 is above a rig antenna 43, 44 at a distance D413 substantially equal to the distance between the antennas and the loops on an operating track. The rig antennas are connected to the control unit 10 by the antenna link 13.

The antennas 41-44 are used for a so-called SF link, where SF is the acronym for Safety Frequency. During operation, the loops arranged at regular intervals in the operating track, make it possible to receive an SF carrier which allows the train to be controlled in speed on the track.

As shown in FIG. 5, on an operating track, an actual SF antenna 49 comprises a succession of loops 46 that gross at a defined interval D47. Each crossing 47 is called a chevron 47. Each loop 46 emits a magnetic field that is inverted at each chevron.

FIG. 6 shows the operation of the SF link on an operating track. The top portion of FIG. 6 shows a first position of the train 2 with respect to the antenna 19, and the bottom portion of FIG. 6 shows a second position of the train 2 with respect to this antenna.

The train 2 has two antennas 41, 42 in order to receive a SF signal. These antennas 41, 42, respectively known under antenna names AREC1 and AREC2, are separated from one another by a fixed distance D412. When these two antennas are above the same loop (top portion of FIG. 6), they receive an in-phase signal. When they are not above the same loop (bottom portion of FIG. 6), they receive a push-pull signal. It is this transition that is observed by the train and which enables the detection of chevrons.

FIG. 7 shows a simulation of the SF link by the rig 1. The left portion of FIG. 7 shows the simulation of a first position of the train 2 wherein the antennas SF 41, 42 of the train 2 are above the same loop, and, the right portion of FIG. 7 shows the simulation of a second position of the train 2 wherein the antennas SF 41, 42 of the train 2 are not above the same loop.

As shown in FIG. 7, in the rig 1, the SF link is simulated by two transmitting antennas 43, 44 located in the rig, each one under a respective antenna 41, 42 of the train. The transmitting antennas are controlled by the control unit 10 and can generate an in-phase SF signal (on the left of FIG. 7) or a push-pull signal (on the right of FIG. 7).

As shown in FIG. 8, the rig comprises a signal generator 70 comprising:
- an antenna case 71 wherein is integrated a coil that is correctly sized to induce the magnetic coupling that makes it possible to transmit information, i.e. the SF signal;
- a power unit 72;
- a unit for forming and processing the signal 73; and,
- an IT control unit 74.

The power unit 72, unit for forming and processing the signal and the IT control unit 74 are arranged in the IT bay 11 of the control unit 10.

A modulation of the SF signal makes it possible to transmit commands to the train. This modulation as well as the controlling of the phase are generated by the unit for forming and processing the signal. Through this means, the SF link provides the transmission data for putting the train into motion, in particular the starting command and the speed. Special attention is therefore required from a safety aspect of this link. This link must not under any circumstances generate a carrier without phase transition when the train is in motion, which would generate a risk of a sudden acceleration of the train. In order to respond to this safety aspect, a speed sensor 51 is installed on one of the belts 27 in order to transmit the rotation speed. This speed is then used by a logic of modelling and of simulating the track which authorises phase transition, i.e. the passing of a chevron only once the specified distance has been "travelled" by the train on the rolling surface 32. In FIG. 4, the distance D6 represents the distance travelled by the train since the last passage of a chevron.

The train furthermore has two anti-collision transmitting antennas that stop transmitting in certain cases linked to safety. When the absence of transmission from these antennas is detected, it results in the stopping of the transmitting of the SF signal.

Two signal receiving anti-collision antennas are placed under the train facing the anti-collision antennas. These antennas are each comprised of a case in which is integrated a coil sized to induce a magnetic coupling that allows for the transmission of information. The signal received is then conditioned then demodulated. The information is sent to the control software.

The train also has telemetry and telecontrol antennas, referred to as TM/TC antennas. A TM/TC link allows for exchanges between the train and the control unit. The train receives TC signals and responds with TM signals. The train has a TM emitting antenna and receives the TC signals via its AREC 41, 42 antennas, provided for the SF signals.

In order to simulate this TM/TC link, an antenna for receiving TM signals is placed under the train facing the TM antenna of the train, and, an antenna for emitting TC signals is placed under the train facing an AREC 41, 42 antenna.

In addition, a train/station link, referred to as LSV/LVS, allows for exchanges between the train and a station. The train receives LSV signals and responds with LVS signals. The train has an LVS emitting antenna and receives the LSV signals via its AREC 41, 42 antennas.

In order to simulate this link, an antenna for receiving LVS signals is placed under the train facing the LVS antenna, and, an antenna for emitting LSV signals is placed under the train facing an AREC antenna.

A voice link is also provided between the train and the control station, in operation, or the control unit 10 on the rig 1. This voice link enables dialogue with an operator located in the train. It can be established in two ways:
- as requested by the station by sending information to the train via the TC antenna; or,
- as requested by the train by sending information to the station via the TM antenna.

When the voice link is established between the station and the train, the voice exchange is carried out via a voice antenna located under the train. This antenna operates for emitting and receiving.

In order to simulate the voice link, a telephone 52 is installed on the desk of the control unit 10 and allows for dialogue with the train. The signal emitted or received by the telephone is conditioned by an electronic resource installed in bay 11. The conditioned signal 14 is then transmitted to a voice antenna installed under the voice antenna of the train. The control software of the rig 1 allows for the sending of a TC frame to the train in order to request the establishing of the voice link. The control software informs the operator in the event of the detection of a TM frame sent by the train requesting the establishing of the voice link; this information can be reported audibly and/or visually.

Metal studs are generally arranged in the operating tracks; they allow a train to know its position on the track and to transmit information. An eddy current sensor, comprised of a mutual inductance bridge that becomes imbalanced in the presence of a metal part less than 95 mm away, is installed in the bottom portion of the train. Studs are metal parts with variable lengths and spacing installed on the track and which are detected by this detector and provide the train with information, in particular a deceleration instruction or platform position information.

FIG. 9 shows a stud simulator 54. The simulator 54 comprises a metal plate 55 which carries small metal squares 56 that can be insulated or electrically connected. In the example shown, relays are used 57 to connect or disconnect the squares. These squares can for example be made of aluminium or copper. According to whether or not the squares are electrically insulated from one another, the stud detector of the train detects or does not detect the presence of a stud. The relays 57 are located in the vicinity of the squares 56 that they make it possible to insulate or electrically connect and are controlled by a control unit located in bay 11. In order to simulate the presence of a stud of a given length, all of the squares are connected together during a duration that is calculated according to the speed of the train. This sequence can be repeated over time to simulate a pair of studs separated from one another by a given distance, therefore by a given time. The calculating of the duration of the simulation of a stud is carried out by the control software, using the speed sensor 51.

During operation, the train is supplied with electricity by a shoe 61 that is in contact with a supply rail. On the rig 1, the train 2 is immobile. The rail comprises a rail 62. The rail 62 comprises a rail section 63 supplied with electricity by a power cable 64. The rail further comprises two sections made of insulating material 66 arranged on either side of the powered section 63. The powered section 63 is arranged in the rig 1 in such a way that when the train 2 is in position to be tested, the shoe 61 rests on it.

In the example shown, the rail further comprises means 67 for driving the powered section 63 according to a longitudinal alternating movement. This movement allows the shoe to not hug the rail. The powered section 63 further comprises a passive radiator to remove the heat due to the friction of the shoe on the rail.

Of course, the invention is not limited to the preferred embodiments that have just been described, but on the contrary the invention is defined by the claims that follow.

It will indeed appear to those skilled in the art that various modifications can be made to the embodiments described hereinabove, in light of the information that has just been disclosed to them.

As such, an electric shaft can be used for the synchronisation of all of the inertial bodies, regardless of the distance, large or small, that separates them.

The rig can furthermore be provided for testing trains comprising a single car or more than two cars. Likewise, it can be provided for a more or less large number of axles.

As such, instead of bearing carried out using a tube and flanges, the inertial body can be carried out by a casting method.

A rig according to the invention can be adapted easily to different types of trains. For example, a distance between the rolling units can be modified easily, according to the distance between the axles of the train to be tested.

The invention claimed is:

1. Rolling unit (8) that can be used in a rig (1) provided for testing a train (2), said rolling unit comprising:
    two rolling belts (27) arranged in such a way that on each belt a wheel (6) can roll carried by a respective end of the same axle (5) of said train (2), with a rolling of said wheels driving a movement of said belts;
    a rotary inertial body (28) operatively engaged with said two rolling belts such that said movement of said two rolling belts drives a rotation of said body; and
    a motor connected to the inertial body (28), with the motor being adapted to modulate a resistance of rotation of said inertial body, thereby to simulate a slope and/or to offset friction internal to the rig;
    wherein each of said two rolling belts is a component of a belt assembly comprising:
    a drive wheel (31), linked in rotation with the inertial body (28); and
    two rollers (33);
    each of said two rolling belts being mounted on said rollers and engaged with said drive wheel, each of said two rolling belts forming between the rollers a substantially horizontal rolling area (34) for a respective wheel (6) of the train (2).

2. Test rig (1) comprising at least one rolling unit (8) according to claim 1.

3. Rolling unit (8) according to claim 1, wherein each of said two rolling belts is grooved and wherein the drive wheel is a pinion (31) meshed with each of said two rolling belts.

4. Test rig (1) comprising at least one rolling unit (8) according to claim 3.

5. Test rig (1) comprising at least one rolling unit (8) according to claim 1.

6. The rolling unit of claim 1, wherein the motor is a gear reducer.

7. Test rig (1) comprising at least one rolling unit (8) according to claim 6.

8. Rolling unit (8) that can be used in a rig (1) provided for testing a train (2), said rolling unit comprising:
    two rolling belts (27) arranged in such a way that on each belt a wheel (6) can roll carried by a respective end of the same axle (5) of said train (2), with a rolling of said wheels driving a movement of said belts; and
    a rotary inertial body (28) operatively engaged with said two rolling belts such that said movement of said two rolling belts drives a rotation of said body;
    wherein each of said two rolling belts is a component of a belt assembly comprising:
    a drive wheel (31), linked in rotation with the inertial body (28); and
    two rollers (33);
    each of said two rolling belts being mounted on said rollers and engaged with said drive wheel, each of said two rolling belts forming between the rollers a substantially horizontal rolling area (34) for a respective wheel (6) of the train (2).

9. Rolling unit (8) according to claim 8, further comprising a motor connected to the inertial body (28), with the motor being adapted to modulate a resistance of rotation of said inertial body, thereby to simulate a slope and/or to offset friction internal to the rig.

10. The rolling unit of claim 9, wherein the motor is a gear reducer.

11. Test rig (1) comprising at least one rolling unit (8) according to claim 10.

12. Test rig (1) comprising at least one rolling unit (8) according to claim 9.

13. Test rig (1) comprising at least one rolling unit (8) according to claim 8.

14. Rolling unit (8) according to claim 8, wherein each of said two rolling belts is grooved and wherein the drive wheel is a pinion (31) meshed with each of said two rolling belts.

15. Test rig (1) comprising at least one rolling unit (8) according to claim 14.

* * * * *